United States Patent
Cui et al.

(10) Patent No.: US 10,148,561 B2
(45) Date of Patent: Dec. 4, 2018

(54) ENHANCED QUALITY OF SERVICE IN SOFTWARE-DEFINED NETWORKING-BASED CONNECTIONLESS MOBILITY ARCHITECTURE

(71) Applicant: AT&T Intellectual Property I, L.P., Atlanta, GA (US)

(72) Inventors: Zhi Cui, Sugar Hill, GA (US); Jiansong Wang, Parlin, NJ (US); Paul Edward Smith, Jr., Rockwall, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/370,952

(22) Filed: Dec. 6, 2016

(65) Prior Publication Data
US 2018/0159766 A1 Jun. 7, 2018

(51) Int. Cl.
*H04L 12/28* (2006.01)
*H04L 12/725* (2013.01)
*H04W 28/24* (2009.01)
*H04L 12/833* (2013.01)
*H04J 1/16* (2006.01)

(52) U.S. Cl.
CPC ......... *H04L 45/302* (2013.01); *H04L 47/31* (2013.01); *H04W 28/24* (2013.01)

(58) Field of Classification Search
USPC ........ 370/252, 389, 386, 329; 379/252, 389, 379/386, 329
See application file for complete search history.

(56) References Cited

U.S. PATENT DOCUMENTS

| | | | |
|---|---|---|---|
| 6,735,202 B1 | 5/2004 | Ahmed et al. | |
| 6,898,641 B1 | 5/2005 | Kobayashi | |
| 7,289,453 B2 | 10/2007 | Riedel et al. | |
| 7,321,587 B2 | 1/2008 | Gao et al. | |
| 9,215,093 B2 | 12/2015 | Han et al. | |
| 2014/0269724 A1* | 9/2014 | Mehler | H04L 45/30 370/392 |

(Continued)

OTHER PUBLICATIONS

Li et al., "Toward Software-Defined Cellular Networks," 2012 European Workshop on Software Defined Networking, Oct. 25-26, 2012, IEEE.

(Continued)

*Primary Examiner* — John Pezzlo
(74) *Attorney, Agent, or Firm* — Hartman & Citrin LLC

(57) ABSTRACT

Concepts and technologies disclosed herein are directed to providing enhanced quality of service ("QoS") in a software-defined network ("SDN")-based connectionless mobility architecture. According to one aspect of the concepts and technologies disclosed herein, an SDN controller can receive service level requirements and can map the service level requirements to QoS requirements and attributes to be associated with a QoS tag. The SDN controller can configure a service entry point to insert the QoS tag into incoming packets so that one or more other service points can extract the QoS tag. The other service point(s) can determine, based upon the QoS tag, a QoS treatment to apply to the incoming packets. The other service point(s) can apply the QoS treatment to the incoming packets in accordance with the QoS tag.

20 Claims, 6 Drawing Sheets

(56) References Cited

U.S. PATENT DOCUMENTS

| | | |
|---|---|---|
| 2014/0310388 A1 | 10/2014 | Djukic et al. |
| 2015/0063112 A1 | 3/2015 | Wu et al. |
| 2015/0207724 A1* | 7/2015 | Choudhury ............. H04L 41/12 370/255 |
| 2015/0263888 A1 | 9/2015 | Hallivuori et al. |
| 2015/0370586 A1* | 12/2015 | Cooper ............... G06F 9/45533 710/308 |
| 2016/0173410 A1 | 6/2016 | Lopez |
| 2016/0182400 A1 | 6/2016 | Ceccarelli et al. |
| 2016/0197839 A1 | 7/2016 | Li et al. |
| 2016/0254984 A1 | 9/2016 | Tekalp et al. |
| 2016/0261493 A1 | 9/2016 | Li |
| 2016/0262044 A1 | 9/2016 | Calin et al. |
| 2017/0078176 A1* | 3/2017 | Lakshmikantha .. H04L 43/0852 |
| 2017/0085628 A1* | 3/2017 | Mahindra ............... H04L 67/10 |
| 2017/0099211 A1* | 4/2017 | Iovanna .................. H04L 45/02 |

OTHER PUBLICATIONS

Egilmez et al., "OpenQoS: An OpenFlow Controller Design for Multimedia Delivery with End-to-End Quality of Service over Software-Defined Networks," 2012 Asia-Pacific Signal and Information Processing Association Annual Summit and Conference (APSIPA ASC), Dec. 3-6, 2012, IEEE.

Bari et al., "PolicyCop: An Autonomic QoS Policy Enforcement Framework for Software Defined Networks," 2013 IEEE SDN for Future Networks and Services, Nov. 11-13, 2013, IEEE.

\* cited by examiner

ENHANCED QUALITY OF SERVICE IN SOFTWARE-DEFINED NETWORKING-BASED CONNECTIONLESS MOBILITY ARCHITECTURE

BACKGROUND

Mobile network traffic has been growing at a very fast pace. In addition, the variation of network end points, the variation of applications, and the variation of mobility states of user equipment devices ("UE") (e.g., whether or not a UE is moving, and if so, how fast) are growing, and this trend will likely continue.

In the current state of the art, different radio technologies, such as WI-FI and cellular, utilize different management and control mechanisms, and the same is true even within Third Generation Partnership Project ("3GPP") cellular technologies. Current cellular mobility management treats all network end points as equal. This management approach works for existing device types, including, for example, smart devices such as smart phones, tablets, and the like.

The traditional approach of cellular mobility management that treats all network end points the same will no longer work cost effectively in the new paradigm where billions of Internet of Things ("IoT") and machine-to-machine ("M2M") end points exist and most of these devices never move. The evolution to 5G networks will embrace a mosaic of radio access technologies ("RATs"). For this reason, a better, simpler, and more cost-effective mobility management approach is needed that can also take into account the device type.

Current cellular standards for quality of service ("QoS") support rely upon general packet radio service ("GPRS") tunneling protocol ("GTP") tunnel and bearer concepts. These concepts are based upon a connection-oriented architecture and will not scale well in the new paradigm where billions of IoT/M2M end points will be deployed. Although some progress has been made in the industry with regard to how to use software-defined networking ("SDN") to provide QoS in a mobility network, this progress has heretofore been limited to applying SDN QoS to an existing connection-oriented mobility bearer architecture.

QoS for connectionless networks is currently being implemented using a differentiated services ("DiffServ") architecture. The DiffServ architecture is based upon a per-flow behavior. At the service level, this per-flow QoS concept has been implemented for instance in the policy and charging rules function ("PCRF") and packet gateway ("P-GW") today. At the flow endpoints, the QoS service-level agreement ("SLA") is translated into an IP differentiated services code point ("DSCP") value and IP queue requirements. The IP DSCP value is translated to an Ethernet precedence level and the IP Queue requirements are translated into the Ethernet queue requirements at the Ethernet level at the flow endpoints. However, when a packet is forwarded, the QoS SLA information and the queue requirements are not forwarded with the packets in the current connectionless model—only the IP DSCP value and the Ethernet precedence are forwarded. Therefore, without a connection-oriented control protocol, an issue exists regarding how consistent behaviors can be maintained within intermediate routers on queue management requirements.

SUMMARY

Concepts and technologies disclosed herein are directed to providing enhanced QoS in an SDN-based connectionless mobility architecture. The concepts and technologies disclosed herein provide a consistent and predictable QoS behavior in intermediate routes by using a tag to include key queue parameters that provide a range for each QoS-related parameter value so that the intermediate router behaviors are predictable and within a defined range. This connectionless mobility QoS mechanism allows for the removal of the current dependency upon GTP tunnels, bearers, and QoS class identifiers ("QCIs") that currently exist in mobility networks as these networks evolve to 5G and future generation technologies.

According to one aspect of the concepts and technologies disclosed herein, an SDN controller can receive service level requirements. The SDN controller can map the service level requirements to QoS requirements and attributes to be associated with a QoS tag. The SDN controller can configure a service entry point to insert the QoS tag into incoming packets. The service entry point can receive the incoming packets and can add the QoS tag into each packet of the incoming packets. The service entry point can then provide the incoming packets with the QoS tag to a service point. The service point can include an intermediate service point embodied, for example, as an SDN router along a service/flow path between the service entry point and a service exit point. The intermediate service point can receive the incoming packets. The intermediate service point can extract the QoS tag from the incoming packets. The intermediate service point can determine, based upon the QoS tag, a QoS treatment to apply to the incoming packets. The intermediate service point can apply the QoS treatment to the incoming packets in accordance with the QoS tag. The intermediate service point can provide the incoming packets to a service exit point. The service exit point can receive the incoming packets and can remove the QoS tag from the incoming packets prior to delivering the incoming packets to a destination.

In some embodiments, the service entry point can include an SDN router serving an eNodeB. The service exit point, in these embodiments, can include a network edge SDN router serving a network edge connected to a packet data network. In some other embodiments, the service entry point can include a network edge SDN router and the service exit point can include an SDN router serving an eNodeB.

In some embodiments, the service level requirements are provided by an operator. Alternatively, the service level requirements can be provided by an operations support system ("OSS") or a business support system ("BSS"). The service level requirements can be provided by other entities.

In some embodiments, the QoS requirements include a precedence level, a minimum data rate, a relative bandwidth, a queue depth, or some combination thereof. Other QoS requirements are contemplated, and as such, these QoS requirements should not be construed as being limiting in any way.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter.

Furthermore, the claimed subject matter is not limited to implementations that solve any or all disadvantages noted in any part of this disclosure.

DETAILED DESCRIPTION

Concepts and technologies disclosed herein are directed to providing enhanced QoS in an SDN-based connectionless mobility architecture. The concepts and technologies disclosed herein provide a consistent and predictable QoS behavior in intermediate routes by using a tag to include key queue parameters that provide a range for each QoS-related parameter value so that the intermediate router behaviors are predictable and within a defined range. This connectionless mobility QoS mechanism allows for the removal of the current dependency upon GTP tunnels, bearers, and QCIs that currently exist in mobility networks as these networks evolve to 5G and future generation technologies. Moreover, the concepts and technologies disclosed herein provide the benefits of improving the future mobility network scalability/efficiency and improving end user experience with consistent and predictable QoS.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
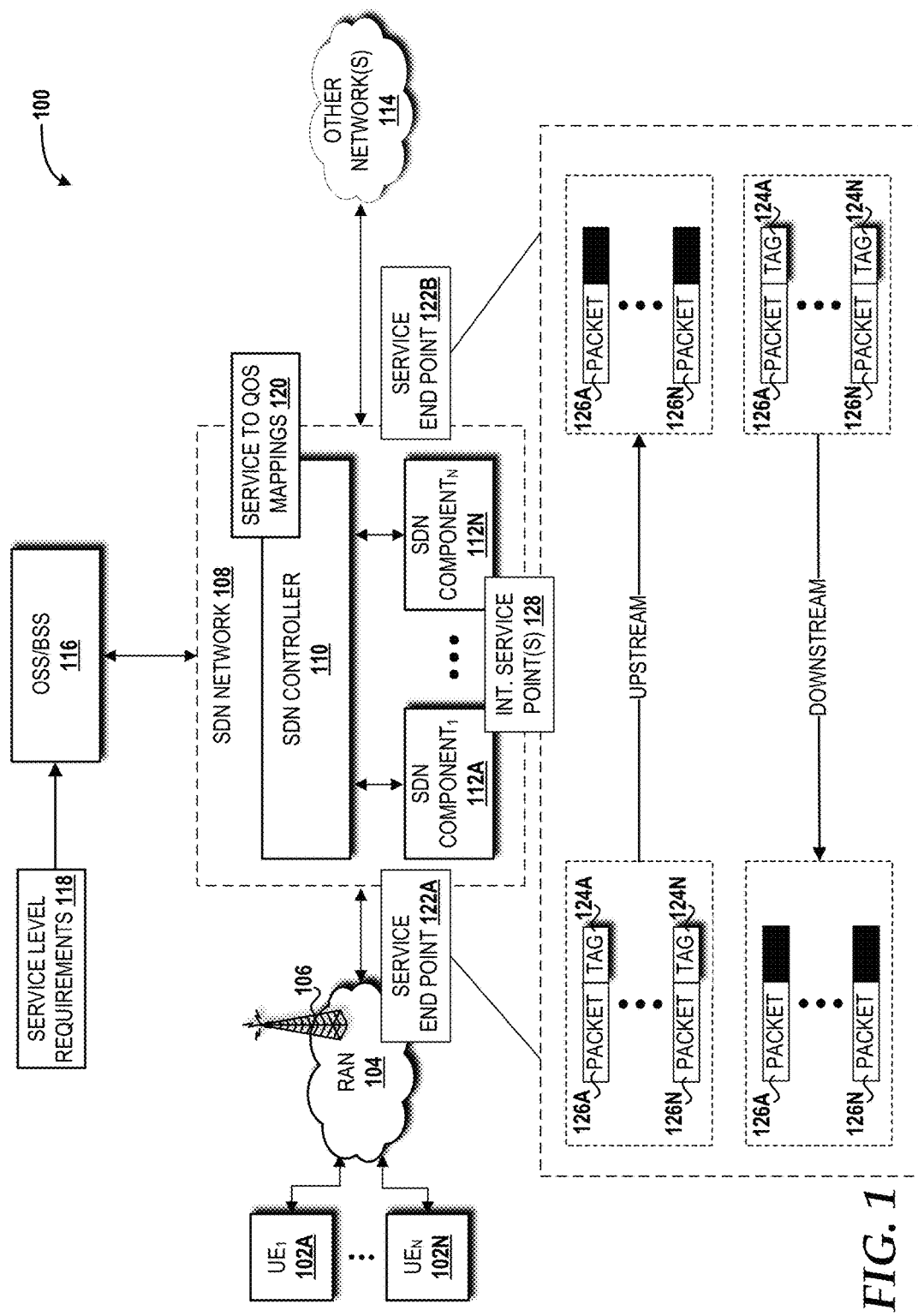
FIG. 1 is a block diagram illustrating an SDN-based connectionless mobility architecture in which aspects of the concepts and technologies disclosed herein can be implemented.

Turning now to FIG. 1, a block diagram illustrating an SDN-based connectionless mobility architecture 100 ("the architecture 100") in which aspects of the concepts and technologies disclosed herein can be implemented will be described. The architecture 100 includes a plurality of user equipment ("UE") devices 102A-102N (referred to herein collectively a "UEs 102," or singularly as "UE 102"). The UEs 102 are currently operating in communication with a radio access network RAN 104. Each of the UEs 102 can be a cellular phone, a feature phone, a smartphone, a mobile computing device, a tablet computing device, a portable television, a portable video game console, or the like capable of communicating with the RAN 104.

The RAN 104 can include one or more service areas (also referred to herein as "cells") having the same or different cell sizes. The RAN 104 can operate in accordance with one or more RATs that utilize mobile telecommunications standards including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other current 3GPP cellular technologies, other future 3GPP cellular technologies, combinations thereof, and/or the like. The RAN 104 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the UEs 102. Data communications can be provided in part by the RAN 104 using GPRS, Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the RAN 104 may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like. The concepts and technologies disclosed herein will, at times, be described in context of the RAN 104 operating in accordance with LTE specifications, although those skilled in the art will appreciate the applicability of the concepts and technologies disclosed herein to other cellular technologies, including, in particular, those captured within future generation 3GPP standards. For purposes of this disclosure, the RAN 104 will be described as being an E-UTRAN. This embodiment should not be construed as being limiting in any way. Moreover, in some embodiments, the RAN 104 is or includes one or more virtual RANs ("vRANs") designed to operate in accordance with 3GPP specifications.

In some embodiments, one or more of the UEs 102 is an Internet of Things ("IoT") or machine-to-machine ("M2M") device. As an IoT device, the UE(s) 102 can be or can include any "thing" that is configured to be network addressable so as to connect to and communicate with one or more networks, such as the RAN 104 and other networks described herein, over which to communicate with other connected devices, including, for example, computers, smartphones, tablets, vehicles, other IoT/M2M devices, servers, other networks, the Internet, combinations thereof, and the like. Moreover, the UE(s) 102 embodied as an IoT device can be deployed for consumer use, business use, and can find application in many industry-specific use cases. For example, the UE(s) 102 embodied as an IoT device may find at least partial application in the following industries: automotive; energy; healthcare; industrial; retail; and smart buildings/homes. Those skilled in the art will appreciate the applicability of IoT-solutions to other industries as well as consumer and business use cases. For this reason, applications of the UE(s) 102 embodied as an IoT device described herein are used merely to illustrate some example applications of IoT devices, and therefore should not be construed as being limiting in any way. It should be understood that the UE(s) 102 can be a mobile device capable of movement through the RAN 104 or a stationary device.

The UE(s) 102 can communicate with the RAN 104 by way of one or more base stations 106, although only a single base station is shown in the illustrated example. As used herein, a "base station" refers to a radio receiver and/or transmitter (collectively, transceiver) that is/are configured to provide a radio/air interface over which one or more devices, such as the UEs 102, can connect to a network, such as the RAN 104. Accordingly, a base station is intended to encompass one or more base transceiver stations ("BTSs"), one or more NodeBs, one or more eNodeBs ("eNBs"), and/or other networking nodes or combinations thereof that are capable of providing a radio/air interface for the RAN 104 regardless of the technologies utilized to do so. A base station can be in communication with one or more antennas (not shown), each of which may be configured in accordance with any antenna design specifications to provide a physical interface for receiving and transmitting radio waves to and from one or more devices, such as the UE 102. The illustrated base station 106 will be described in context of providing the radio/air interface for an E-UTRAN, and as such, will be described as an eNB.

The RAN 104 is shown as being in communication with and being controlled by an SDN network 108. The SDN network 108 is a network implemented in accordance with SDN concepts. SDN is an architectural framework for creating intelligent networks that are programmable, application-aware, and more open. SDN provides an agile and cost-effective communications platform for handling the dramatic increase in data traffic on carrier networks by providing a high degree of scalability, security, and flexibility. SDN provides several benefits. SDNs can allow for the creation of multiple, virtual network control planes on common hardware. SDN can help extend service virtualization and software control into many existing network elements. SDN enables applications to request and manipulate services provided by the network and allow the network to expose network states back to the applications. SDN exposes network capabilities through application programming interfaces ("APIs"), making the control of network equipment remotely accessible and modifiable via third-party software clients, using open protocols such as Open-Flow, available from Open Network Forum ("ONF"). 3GPP and other standards bodies and industry forums are currently working to standardize SDN for use in multiple aspects of future mobile telecommunications networks under 5G standards. An illustrative network functions virtualization platform ("NFVP") upon which the SDN concepts described herein can be implemented is described herein below with reference to FIG. 6.

The illustrated SDN network 108 includes an SDN controller 110. The SDN controller 110 can, on-demand, allocate wireless spectrum resources to the base stations 106 operating in the RAN 104. The SDN controller 110 can be configured to support any access networks, such as the RAN 104, through a connectionless-based native IP protocol interface. The SDN controller 110 also can manage mobility of devices, such as the illustrated UEs 102, during handover between the base stations 106. The SDN controller 110 also can manage session continuity for the UE 102 as communications are handed over between base stations served by the SDN network 108.

In the illustrated SDN network 108, the SDN controller 110 is in communication with a plurality of SDN components 112A-112N (referred to herein collectively as SDN components 112, or in the singular form as SDN component 112). The SDN controller 110 can control operations of the SDN components 112 based upon one or more QoS policies. The SDN components 112 can include one or more routers, one or more switches, one or more gateways, or some combination thereof. In some embodiments, the SDN components 112 utilize OpenFlow protocols and function as OpenFlow switches or OpenFlow routers, although the concepts and technologies disclosed herein are not limited to OpenFlow protocols. In some embodiments, the SDN components 112 provide, at least in part, an evolved packet core ("EPC") network. An EPC network provides core network functions in accordance with 3GPP standards specifications. Accordingly, an EPC network can include one or more mobility management entity ("MMEs"), one or more serving gateways ("S-GWs"), one or more packet data network gateways ("P-GWs"), one or more combination S-GW/P-GWs, one or more home subscriber servers ("HSSs"), one or more policy and charging rules functions ("PCRFs"), one or more DIAMETER routing agents ("DRAs"), one or more DIAMETER edge agents ("DEAs"), or any combination thereof.

The SDN components 112 can include one or more MMES. An MME can be configured in accordance with 3GPP standards specifications. An MME, in general, can perform operations to control signaling traffic related to mobility and security for access to the RAN 104.

The SDN components 112 can include one or more S-GWs. An S-GW can be configured in accordance with 3GPP standards specifications. An S-GW provides a point of interconnect between the radio-side (e.g., the RAN 104) and an EPC network, such as an SDN EPC network created by the SDN components 112. An S-GW serves the UEs 102 by routing incoming and outgoing IP packets towards one or more other networks 114, such as one or more packet data networks ("PDNs") (e.g., the Internet).

The SDN components 112 can include one or more P-GWs. A P-GW can be configured in accordance with 3GPP standards specifications. A P-GW interconnects an EPC network and one or more external IP networks, such as, for example, one or more other networks, including other public land mobile networks ("PLMNs"), PDNs, circuit-switched networks, and the like. A P-GW routes IP packets to and from other network(s). A P-GW also performs operations such as IP address/IP prefix allocation, policy control, and charging.

The SDN components 112 can include one or more HSSs. An HSS can be configured in accordance with 3GPP standards specifications. An HSS is a database that contains user-related information for users of devices, such as the UEs 102. An HSS can provide support functions to one or more MMES for mobility management, call and session setup, user authentication, and access authorization.

The SDN components 112 can include one or more PCRFs. A PCRF can be configured in accordance with 3GPP standards specifications. A PCRF can determine policy rules, detect service data flows, enforce policies, and perform flow-based charging.

The SDN components 112 can include one or more DRAs. A DRA can be configured in accordance with 3GPP standards specifications. A DRA is a functional element in a 3G or 4G (e.g., LTE) network that provides real-time routing capabilities to ensure that messages are routed among the correct elements within a network. DRAs were introduced by the 3GPP to address the increased DIAMETER signaling traffic and growing complexity of 4G LTE networks. A DRA can provide real-time routing capabilities to ensure that DIAMETER signaling messages are routed to the correct resources in an EPC network.

The SDN components 112 can include one or more DEAs. A DEA can be configured in accordance with 3GPP standards specifications. A DEA provides a point of contact into and out of an EPC core network at the DIAMETER application level. A DEA provides secure communications to connect an EPC network to the other network(s) to facilitate internetwork signaling operations (e.g., roaming, charging, and billing), for example, between home and visited PLMN. A DEA can enable DIAMETER signaling traffic to flow core networks while also disguising the topology of the core networks to one another.

The SDN network 108 is in communication with an operations support systems ("OSS") and business support systems ("BSS") 116 ("OSS/BSS" 116). The OSS of the OSS/BSS 116 can manage the network and services and support management functions such as, for example, service assurance, capacity management, performance management, and the like. The BSS of the OSS/BSS 116 can run the business operations towards customers and support functions such as, for example, sales, ordering, and the like. In the illustrated embodiment, the OSS/BSS 116 can receive one or more service level requirements 118 as input to be provided to the SDN controller 110 to notify the SDN controller 110 of one or more requirements of one or more services to be provided, at least in part, by the SDN network 108. In some embodiments, the SDN controller 110 can additionally or alternatively receive the service level requirements 118 from one or more other entities, such as an operator, a user, a third party application, and/or the like.

The SDN controller 110 receives the service level requirements 118 and maps the service level requirements 118 to one or more QoS requirements and attributes—shown as service to QoS mappings 120 ("mappings" 120). The mappings 120 can be defined, at least in part, by what information/attribute(s) a QoS requirement is based upon—for example, a differentiated services code point ("DSCP"), a 5-tuple, a source IP address, a destination IP address, a specific service or service type, a UE type or UE category, any combination thereof, and/or the like. The mappings 120 can include one or more QoS parameters, some examples of which include, for example, precedence level, minimum data rate, relative bandwidth, queue depth, and the like. The QoS parameters applicable to a particular service can be governed by QoS policies that can be associated with QCIs. Each QCI denotes a set of transport characteristics, including whether the bearer provides a guaranteed bit rate ("CBR"), priority, packet delay budget, and packet error loss rate, and is utilized to instruct the SDN components 112 to utilize specific parameters for controlling packet forwarding treatment (e.g., scheduling weights, admission thresholds, queue management thresholds, link-layer protocol configuration, and the like). 3GPP has defined, in 3GPP Release 8, nine QCIs, each associated with a preset set of transport characteristics according to the level of service required by various services. Those skilled in the art will appreciate the applicability of the concepts and technologies disclosed herein to any service level requirements 118, any QoS requirements, any QoS attributes, any QoS parameters, and/or any QCIs, including custom QCIs not explicitly defined by 3GPP. As such, the example QoS provided herein should not be construed as being limiting in any way.

For each mobility session/flow, the SDN controller 110 configures a service end point 122A, 122B to insert a QoS tag 124A-124N into each packet 126A-126N in the flow. A QoS tag 124 can include QoS parameters such as those described above. A QoS tag 124 provides the QoS information in each packet without utilizing an explicitly connection-oriented signaling protocol.

In some embodiments, the service end points 122A, 122B can be embodied as one of the SDN components 112 operating as OpenFlow routers. In the illustrated embodiment, the service end point 122A can serve as a service entry point for upstream packet flow from the RAN 104 towards the service end point 122B, which can be a service edge router serving as a service exit point towards the other network(s) 114. Alternatively, the service end point 122A can serve as a service exit point for downstream packet flow from the other network(s) 114. The SDN network 108 also can include one or more intermediate service points 128, embodied by one or more of the SDN components 112. The intermediate service points 128 can apply QoS, including priority, scheduling, and queue management treatment to the packets 126 based upon the QoS parameter(s) contained in the QoS tag 124 so that the intermediate service points 128 have behavior that is predictable and within a defined range. In an alternative embodiment, the SDN controller 110 can configure the intermediate service points 128 regarding packet QoS treatment, such as priority and queue management based upon the QoS tag 124.

Figure 2:
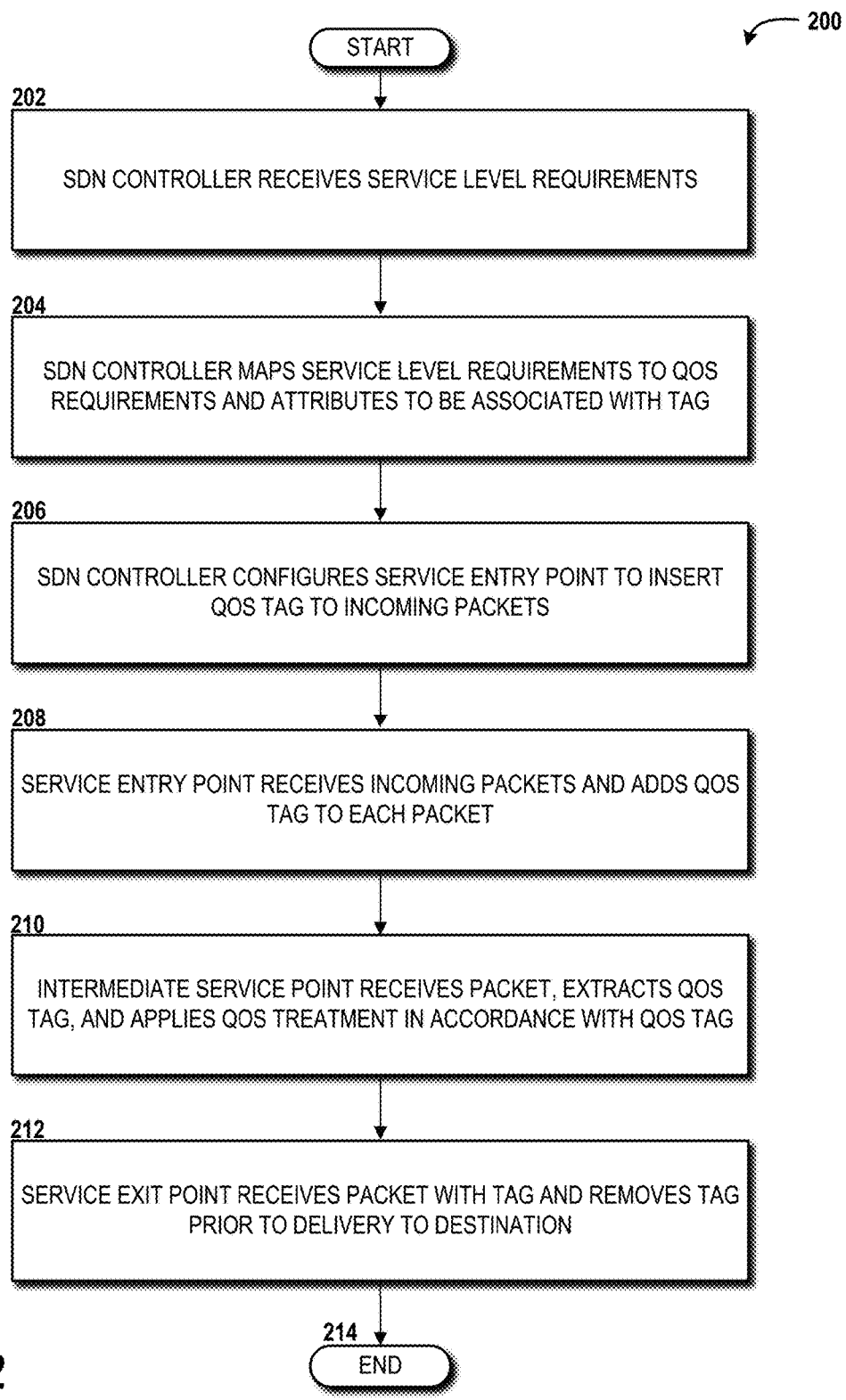
FIG. 2 is a flow diagram illustrating a method for providing enhanced QoS in an SDN-based connectionless mobility architecture, according to an illustrative embodiment.

Turning now to FIG. 2, aspects of a method 200 for providing enhanced QoS in the SDN-based connectionless mobility architecture 100 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multi-processor systems, distributed computing systems, mini-computers, mainframe computers, personal computers, hand-held computing devices, microprocessor-based, programmable consumer electronics, network nodes, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 will be described with reference to FIG. 2 and further reference to FIG. 1. Moreover, the operations of the method 200 will be described as being performed by the SDN controller 110 and the SDN components 112 (embodied as the service end points 122A, 122B and the intermediate service point(s) 128), or some combination thereof. These operations can be performed via execution, by one or more processors, of one or more software program modules or applications.

The method 200 begins and proceeds to operation 202, where the SDN controller 110 receives service level requirements 118. In some embodiments, the service level requirements 118 are provided by an operator. Alternatively, the service level requirements can be provided by the OSS/BSS 116. The service level requirements can be provided by other entities. The service level requirements can be consistent with the type of service requested. Some example services include, but are not limited to, audio, video, gaming, multimedia streaming, and the like.

From operation 202, the method 200 proceeds to operation 204, where the SDN controller 110 maps, based upon the mappings 120, the service level requirements 118 to QoS requirements and attributes to be associated with a QoS tag 124. For example, the service level requirements for a gaming service can be mapped to QoS requirements and attributes such as a minimum data rate set to 10 megabits per second ("mbps"), relative bandwidth set to 10% of available bandwidth capacity, max delay jitter set to 2 milliseconds, queue depth, and DSCP set to CS1. The service level requirements for a multimedia streaming service, for example, can be mapped to QoS requirements and attributes such as minimum data rate set to 5 mbps, relative bandwidth set to 5% of available bandwidth capacity, queue depth, and DSCP set to AF31.

From operation 204, the method 200 proceeds to operation 206, where the SDN controller 110 configures a service entry point (e.g., the service end point 122A for upstream flow or the service end point 122B for downstream flow as in the example shown in FIG. 1) to insert a QoS tag 124 into incoming packets 126. From operation 206, the method 200 proceeds to operation 208, where the service entry point receives the packets 126 and adds a QoS tag 124 into each of the packets 126. From operation 208, the method 200 proceeds to operation 210, where an intermediate service point 128 receives the packets 126, extracts the QoS tag 124, and applies QoS treatment in accordance with the QoS tag 124. For example, the intermediate service point 128 can apply QoS treatment with regard to class of service, data rate, relative bandwidth, queue depth, a combination thereof, and/or the like. From operation 210, the method 200 proceeds to operation 212, where the service exit point receives the packets 126 with the QoS tag 124 and removes the QoS tag 124 prior to delivery to the destination. From operation 212, the method 200 proceeds to operation 214, where the method 200 ends.

Figure 3:
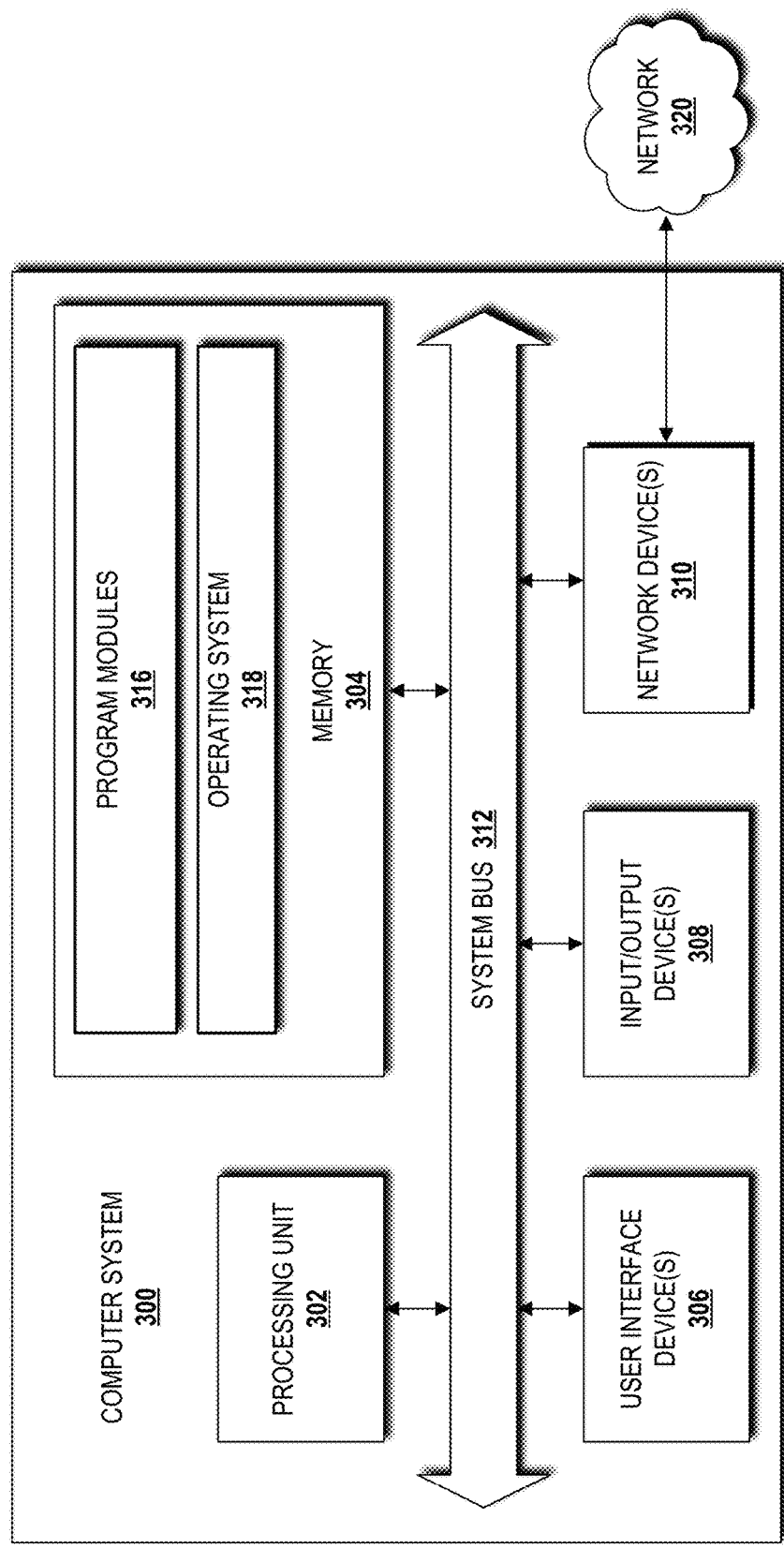
FIG. 3 is a block diagram illustrating an example computer system capable of implementing aspects of the embodiments presented herein.

Turning now to FIG. 3, a block diagram illustrating a computer system 300 configured to provide the functionality in accordance with various embodiments of the concepts and technologies disclosed herein. The systems, devices, and other components disclosed herein, such as, for example, the UEs 102, the base stations 106, the SDN controller 110, the SDN components 112, and/or any other components disclosed herein, or any combination thereof, can utilize or can execute upon, at least in part, an architecture that is the same as or at least similar to the architecture of the computer system 300. It should be understood, however, that modification to the architecture may be made to facilitate certain interactions among elements described herein.

The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 304 communicates with the processing unit 302 via the system bus 312. In some embodiments, the memory 304 is operatively connected to a memory controller (not shown) that enables communication with the processing unit 302 via the system bus 312. The illustrated memory 304 includes an operating system 318 and one or more program modules 316. The operating system 318 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 316 may include various software and/or program modules to perform the various operations described herein. The program modules 316 and/or other programs can be embodied in computer-readable media containing instructions that, when executed by the processing unit 302, perform various operations such as those described herein. According to embodiments, the program modules 316 may be embodied in hardware, software, firmware, or any combination thereof.

By way of example, and not limitation, computer-readable media may include any available computer storage media or communication media that can be accessed by the computer system 300. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300. In the claims, the phrase "computer storage medium" and variations thereof does not include waves or signals per se and/or communication media.

The user interface devices 306 may include one or more devices with which a user accesses the computer system 300. The user interface devices 306 may include, but are not limited to, computers, servers, PDAs, cellular phones, or any suitable computing devices. The I/O devices 308 enable a user to interface with the program modules 316. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer. In some embodiments, the I/O devices 308 can be used for manual controls for operations to exercise under certain emergency situations.

The network devices 310 enable the computer system 300 to communicate with other networks or remote systems via a network 320. Examples of the network devices 310 include, but are not limited to, a modem, a radio frequency ("RF") or infrared ("IR") transceiver, a telephonic interface, a bridge, a router, or a network card. The network 320 may be or may include a wireless network such as, but not limited to, a WLAN, a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 320 may be or may include a wired network such as, but not limited to, a Wide Area Network ("WAN"), a wired Personal Area Network ("PAN"), or a wired Metropolitan Area Network ("MAN"). The network 320 can be or can include any of the networks described herein, such as the RAN 104, the SDN network 108, the other networks 114, and/or any combination thereof.

Figure 4:
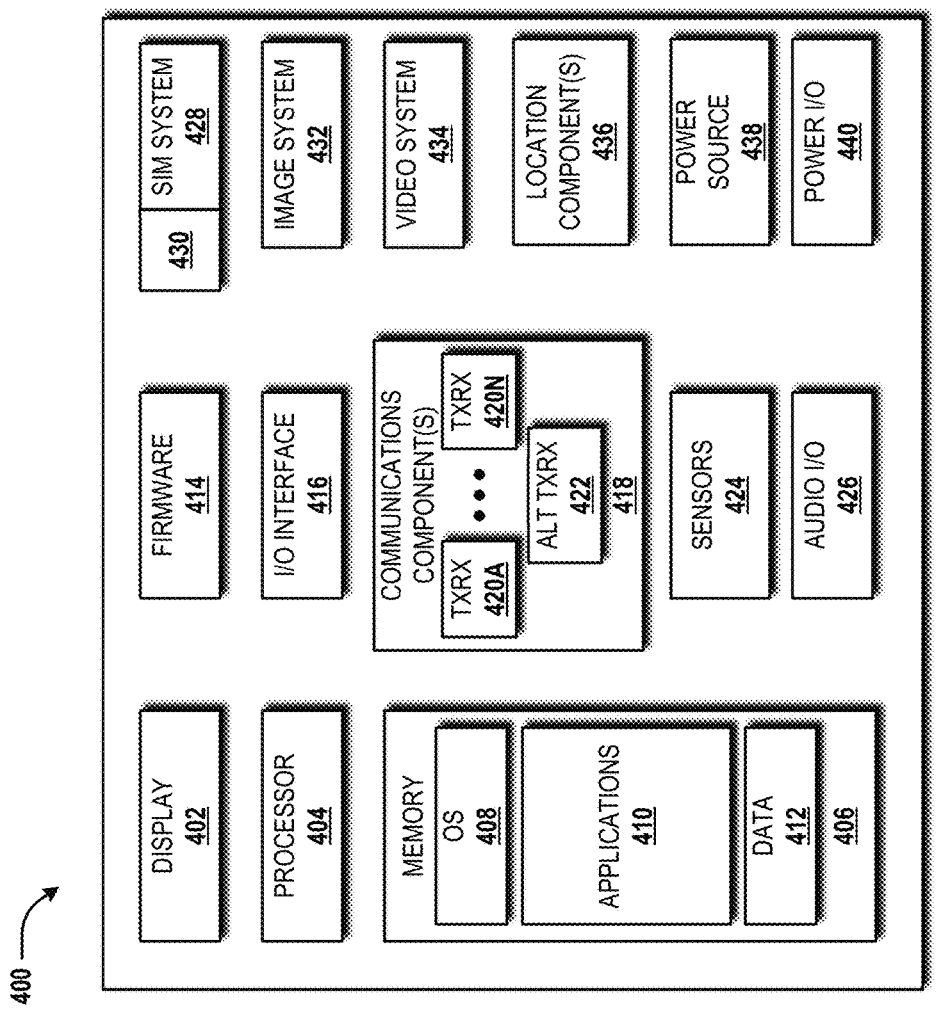
FIG. 4 is a block diagram illustrating an example mobile device capable of implementing aspects of the embodiments disclosed herein.

Turning now to FIG. 4, a block diagram illustrating an example mobile device 400, according to an illustrative embodiment. In some embodiments, one or more of the UEs 102 (shown in FIG. 1) can be configured like the mobile device 400. While connections are not shown between the various components illustrated in FIG. 4, it should be understood that some, none, or all of the components illustrated in FIG. 4 can be configured to interact with one other to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 400 also can include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408, one or more applications 410, other computer-executable instructions stored in a memory 406, or the like. In some embodiments, the applications 410 also can include a user interface ("UI") application (not illustrated in FIG. 4).

The UI application can interface with the operating system 408 to facilitate user interaction with functionality and/or data stored at the mobile device 400 and/or stored elsewhere. In some embodiments, the operating system 408 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in entering content, viewing account information, answering/initiating calls, entering/deleting data, entering and setting user IDs and passwords for device access, configuring settings, manipulating address book content and/or settings, multimode interaction, interacting with other applications 410, and otherwise facilitating user interaction with the operating system 408, the applications 410, and/or other types or instances of data 412 that can be stored at the mobile device 400. The data 412 can include, for example, one or more identifiers, and/or other applications or program modules. According to various embodiments, the data 412 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 410, the data 412, and/or portions thereof can be stored in the memory 406 and/or in a firmware 414, and can be executed by the processor 404. The firmware 414 also can store code for execution during device power up and power down operations. It can be appreciated that the firmware 414 can be stored in a volatile or non-volatile data storage device including, but not limited to, the memory 406 and/or a portion thereof.

The mobile device 400 also can include an input/output ("I/O") interface 416. The I/O interface 416 can be configured to support the input/output of data such as location information, user information, organization information, presence status information, user IDs, passwords, and application initiation (start-up) requests. In some embodiments, the I/O interface 416 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 also can include a communications component 418. The communications component 418 can be configured to interface with the processor 404 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments one or more of the transceivers of the communications component 418 may be configured to communicate using GSM, CDMA ONE, CDMA2000, LTE, and various other 2G, 2.5G, 3G, 4G, 5G, and greater generation technology standards, such as those described herein above as the RATs and the ad-hoc RATs. Moreover, the communications component 418 may facilitate communications over various channel access methods (which may or may not be used by the aforementioned standards) including, but not limited to, TDMA, FDMA, W-CDMA, Orthogonal Frequency-Division Multiplexing ("OFDM"), Space-Division Multiple Access ("SDMA"), and the like.

In addition, the communications component 418 may facilitate data communications GPRS, EDGE, the HSPA protocol family including HSDPA, EUL or otherwise termed HSUPA, HSPA+, and various other current and future wireless data access standards. In the illustrated embodiment, the communications component 418 can include a first transceiver ("TxRx") 420A that can operate in a first communications mode (e.g., GSM). The communications component 418 also can include an N$^{th}$ transceiver ("TxRx") 420N that can operate in a second communications mode relative to the first transceiver 420A (e.g., UMTS). While two transceivers 420A-420N (hereinafter collectively and/or generically referred to as "transceivers 420") are shown in FIG. 4, it should be appreciated that less than two, two, and/or more than two transceivers 420 can be included in the communications component 418.

The communications component 418 also can include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 418 also can facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 also can include one or more sensors 424. The sensors 424 can include temperature sensors, light sensors, air quality sensors, movement sensors, orientation sensors, noise sensors, proximity sensors, or the like. As such, it should be understood that the sensors 424 can include, but are not limited to, accelerometers, magnetometers, gyroscopes, infrared sensors, noise sensors, microphones, combinations thereof, or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 also can include a subscriber identity module ("SIM") system 428. The SIM system 428 can include a universal SIM ("USIM"), a universal integrated circuit card ("UICC") and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 also can include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to an MMS message, email message, and sent to another mobile device. The video and/or photo content also can be shared with other devices via various types of data transfers via wired and/or wireless communication devices as described herein.

The mobile device 400 also can include one or more location components 436. The location components 436 can be configured to send and/or receive signals to determine a geographic location of the mobile device 400. According to various embodiments, the location components 436 can send and/or receive signals from global positioning system ("GPS") devices, assisted GPS ("A-GPS") devices, WI-FI/WIMAX and/or cellular network triangulation data, combinations thereof, and the like. The location component 436 also can be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 also can include a power source 438. The power source 438 can include one or more batteries, power supplies, power cells, and/or other power subsystems including alternating current ("AC") and/or direct current ("DC") power devices. The power source 438 also can interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

Figure 5:
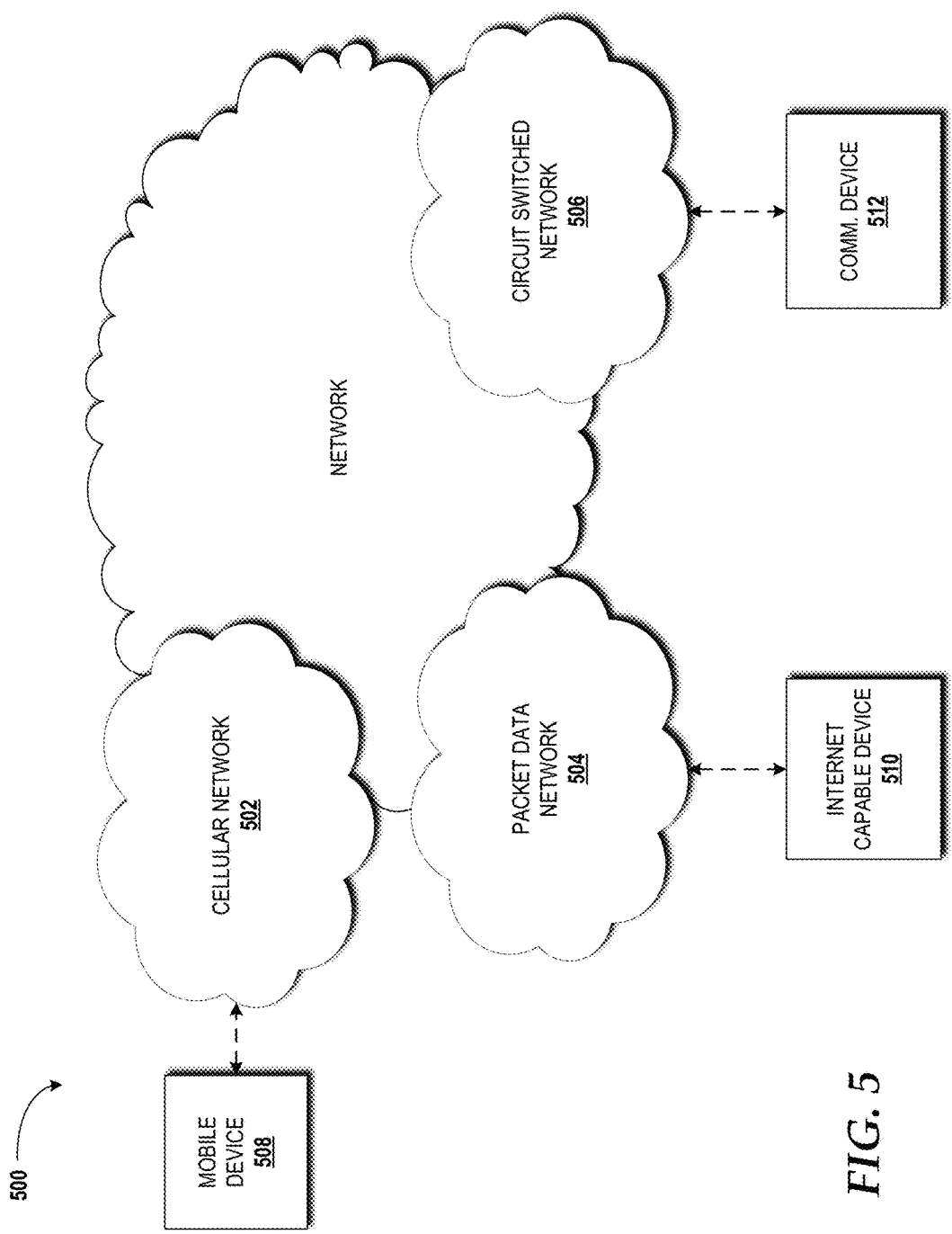
FIG. 5 is a block diagram schematically illustrating a network, according to an illustrative embodiment.

Turning now to FIG. 5, a schematic illustration of a network 500 will be described, according to an illustrative embodiment. The network 500 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), NodeB's or e-NodeB's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, the UE 102, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system ("POTS"). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 500 is used to refer broadly to any combination of the networks 502, 504, 506. It should be appreciated that substantially all of the functionality described with reference to the network 500 can be performed by the cellular network 502, the packet data network 504, and/or the circuit switched network 506, alone or in combination with other networks, network elements, and the like. The network 500 can include the functionality of any of the networks described herein.

Figure 6:
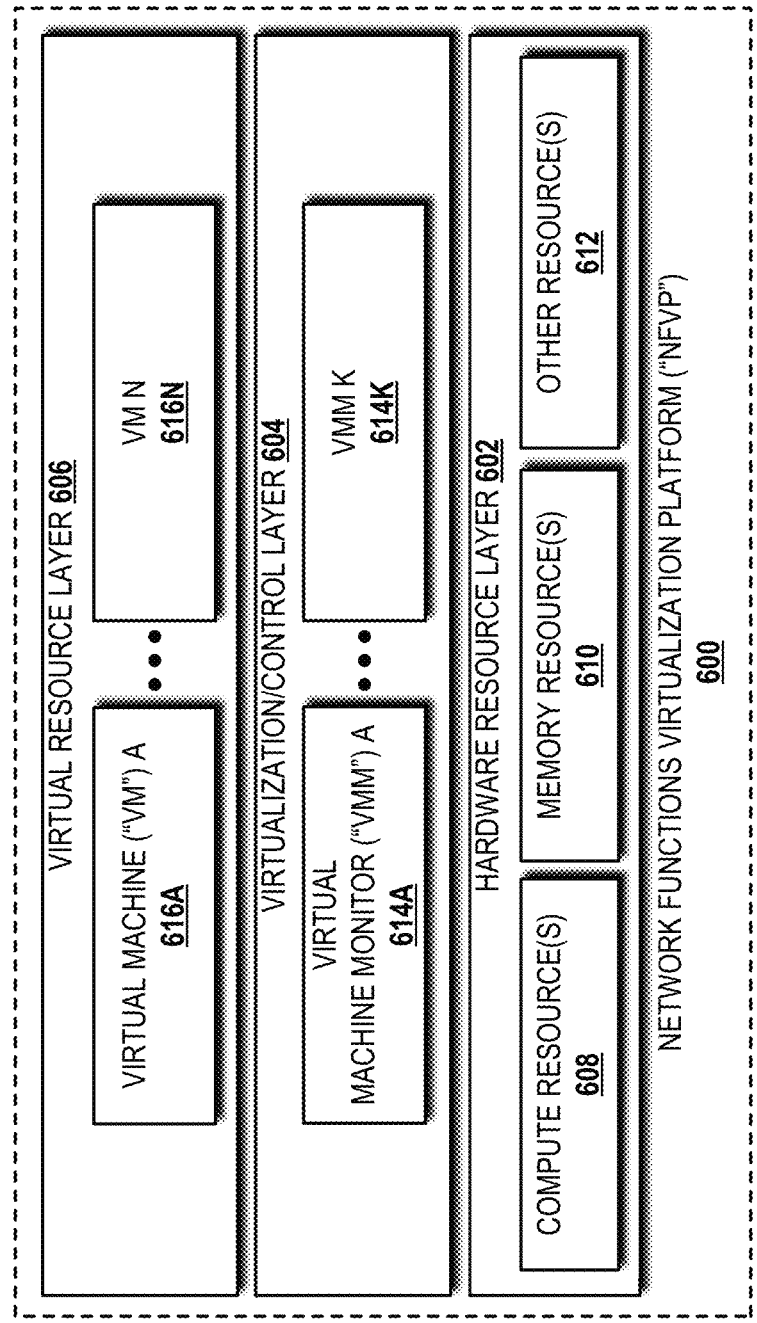
FIG. 6 is a block diagram illustrating an example network functions virtualization platform ("NFVP") capable of implementing aspects of the embodiments presented herein.

Turning now to FIG. 6, a network functions virtualization platform ("NFVP") 600 will be described, according to an exemplary embodiment. The architecture of the NFVP 600 can be used to implement VNFs as virtual counterparts to physical network functions disclosed herein. The NFVP 600 can be utilized to implement, at least in part, components of the SDN network 108—the SDN controller 110 and/or the SDN components 112. The NFVP 600 is a shared infrastructure that can support multiple services and network applications. The illustrated NFVP 600 includes a hardware resource layer 602, a virtualization/control layer 604, and a virtual resource layer 606 that work together to perform operations as will be described in detail herein.

The hardware resource layer 602 provides hardware resources, which, in the illustrated embodiment, include one or more compute resources 608, one or more memory resources 610, and one or more other resources 612. The compute resource(s) 608 can include one or more hardware components that perform computations to process data, and/or to execute computer-executable instructions of one or more application programs, operating systems, and/or other software. The compute resources 608 can include one or more central processing units ("CPUs") configured with one or more processing cores. The compute resources 608 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 608 can include one or more discrete GPUs. In some other embodiments, the compute resources 608 can include CPU and GPU components that are configured in accordance with a co-processing CPU/GPU computing model, wherein the sequential part of an application executes on the CPU and the computationally-intensive part is accelerated by the GPU. The compute resources 608 can include one or more system-on-chip ("SoC") components along with one or more other components, including, for example, one or more of the memory resources 610, and/or one or more of the other resources 612. In some embodiments, the compute resources 608 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 608 can be or can include one or more hardware components architected in accordance with an ARM architecture, available for license from ARM HOLDINGS of Cambridge, United Kingdom. Alternatively, the compute resources 608 can be or can include one or more hardware components architected in accordance with an x86 architecture, such an architecture available from INTEL CORPORATION of Mountain View, Calif., and others. Those skilled in the art will appreciate the implementation of the compute resources 608 can utilize various computation architectures, and as such, the compute resources 608 should not be construed as being limited to any particular computation architecture or combination of computation architectures, including those explicitly disclosed herein.

The memory resource(s) 610 can include one or more hardware components that perform storage operations, including temporary or permanent storage operations. In some embodiments, the memory resource(s) 610 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 608.

The other resource(s) 612 can include any other hardware resources that can be utilized by the compute resources(s) 608 and/or the memory resource(s) 610 to perform operations described herein. The other resource(s) 612 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 602 can be virtualized by one or more virtual machine monitors ("VMMs") 614A-614K (also known as "hypervisors"; hereinafter "VMMs 614") operating within the virtualization/control layer 604 to manage one or more virtual resources that reside in the virtual resource layer 606. The VMMs 614 can be or can include software, firmware, and/or hardware that alone or in combination with other software, firmware, and/or hardware, manages one or more virtual resources operating within the virtual resource layer 606.

The virtual resources operating within the virtual resource layer 606 can include abstractions of at least a portion of the compute resources 608, the memory resources 610, the other resources 612, or any combination thereof. These abstractions are referred to herein as virtual machines ("VMs"). In the illustrated embodiment, the virtual resource layer 606 includes VMs 616A-616N (hereinafter "VMs 616"). Each of the VMs 616 can execute one or more software applications, such as, for example, software application including instructions to implement, at least in part, one or more components of the SDN network 108—for example, the SDN controller 110 and/or the SDN components 112.

Based on the foregoing, it should be appreciated that concepts and technologies directed to providing enhanced QoS in an SDN-based connectionless mobility architecture have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:
1. A method comprising:
  receiving, by an SDN controller, service level requirements;

mapping, by the SDN controller, the service level requirements to QoS information comprising QoS requirements and attributes to be associated with a QoS tag, wherein the QoS tag, when inserted into each incoming packet of a plurality of incoming packets, provides the QoS information for the plurality of incoming packets without using a connection-oriented signaling protocol; and configuring, by the SDN controller, a service entry point to insert the QoS tag into each incoming packet of the plurality of incoming packets.

2. The method of claim 1, further comprising:
receiving, by the service entry point, the plurality of incoming packets;
inserting, by the service entry point, the QoS tag into each incoming packet of the plurality of incoming packets; and
providing, by the service entry point, the plurality of incoming packets, each comprising the QoS tag, to a service point.

3. The method of claim 2, wherein the service point comprises an intermediate service point.

4. The method of claim 3, further comprising:
receiving, by the intermediate service point, the plurality of incoming packets;
extracting, by the intermediate service point, the QoS tag from the plurality of incoming packets;
determining, by the intermediate service point, based upon the QoS tag, a QoS treatment to apply to each of the plurality of incoming packets; and
applying, by the intermediate service point, the QoS treatment to each of the plurality of incoming packets in accordance with the QoS tag.

5. The method of claim 4, further comprising:
providing, by the intermediate service point, the plurality of incoming packets to a service exit point;
receiving, by the service exit point, the plurality of incoming packets; and
removing, by the service exit point, the QoS tag from the plurality of incoming packets.

6. The method of claim 5, wherein:
the service entry point comprises an SDN router serving an eNodeB; and
the service exit point comprises a network edge SDN router serving a network edge connected to a packet data network.

7. The method of claim 5, wherein:
the service entry point comprises a network edge SDN router serving a network edge connected to a packet data network; and
the service exit point comprises an SDN router serving an eNodeB.

8. A system comprising:
a processor, and
memory that stores instructions that, when executed by the processor, cause the processor to perform operations comprising
receiving service level requirements,
mapping the service level requirements to QoS information comprising QoS requirements and attributes to be associated with a QoS tag, wherein the QoS tag, when inserted into each incoming packet of a plurality of incoming packets, provides the QoS information for the plurality of incoming packets without using a connection-oriented signaling protocol, and
configuring a service entry point to insert the QoS tag into each incoming packet of the plurality of incoming packets.

9. The system of claim 8, further comprising the service entry point; and wherein the service entry point performs operations comprising:
receiving the plurality of incoming packets;
inserting the QoS tag into each incoming packet of the plurality of incoming packets; and
providing the plurality of incoming packets, each comprising the QoS tag, to a service point.

10. The system of claim 9, further comprising the service point; wherein the service point comprises an intermediate service point; and wherein the intermediate service point performs operations comprising:
receiving the plurality of incoming packets;
extracting the QoS tag from the plurality of incoming packets;
determining, based upon the QoS tag, a QoS treatment to apply to each of the plurality of incoming packets; and
applying the QoS treatment to each of the plurality of incoming packets in accordance with the QoS tag.

11. The system of claim 10, further comprising a service exit point; and
wherein the operations performed by the intermediate service point further comprise providing the plurality of incoming packets to the service exit point; and
wherein the service exit point performs operations further comprising receiving the plurality of incoming packets, and removing the QoS tag from the plurality of incoming packets.

12. The system of claim 11, wherein:
the service entry point comprises an SDN router serving an eNodeB; and
the service exit point comprises a network edge SDN router serving a network edge connected to a packet data network.

13. The system of claim 11, wherein:
the service entry point comprises a network edge SDN router serving a network edge connected to a packet data network; and
the service exit point comprises an SDN router serving an eNodeB.

14. A computer storage medium comprising computer-executable instructions that, when executed by a processor, causes the processor to perform operations comprising:
receiving service level requirements;
mapping the service level requirements to QoS information comprising QoS requirements and attributes to be associated with a QoS tag, wherein the QoS tag, when inserted into each incoming packet of a plurality of incoming packets, provides the QoS information for the plurality of incoming packets without using a connection-oriented signaling protocol; and
configuring a service entry point to insert the QoS tag into each incoming packet of the plurality of incoming packets.

15. The computer storage medium of claim 14, wherein receiving the service level requirements comprises receiving the service level requirements from an operator.

16. The computer storage medium of claim 14, wherein receiving the service level requirements comprises receiving the service level requirements from an operations support system or a business support system.

17. The computer storage medium of claim 14, wherein the service entry point comprises an SDN router serving an eNodeB.

18. The computer storage medium of claim 14, wherein the service entry point comprises a network edge SDN router serving a network edge connected to a packet data network.

19. The computer storage medium of claim 14, wherein the QoS information comprises a precedence level, a minimum data rate, a relative bandwidth, or a queue depth.

20. The computer storage medium of claim 19, wherein the QoS tag causes a service point to determine, based upon the QoS tag, a QoS treatment to apply to each incoming packet of the plurality of incoming packets, and to apply the QoS treatment to each incoming packet of the plurality of incoming packets in accordance with the QoS tag.

\* \* \* \* \*